E. C. FORD.
SPRING PERCH FOR BIRD-CAGES.
No. 173,934. Patented Feb. 22, 1876.
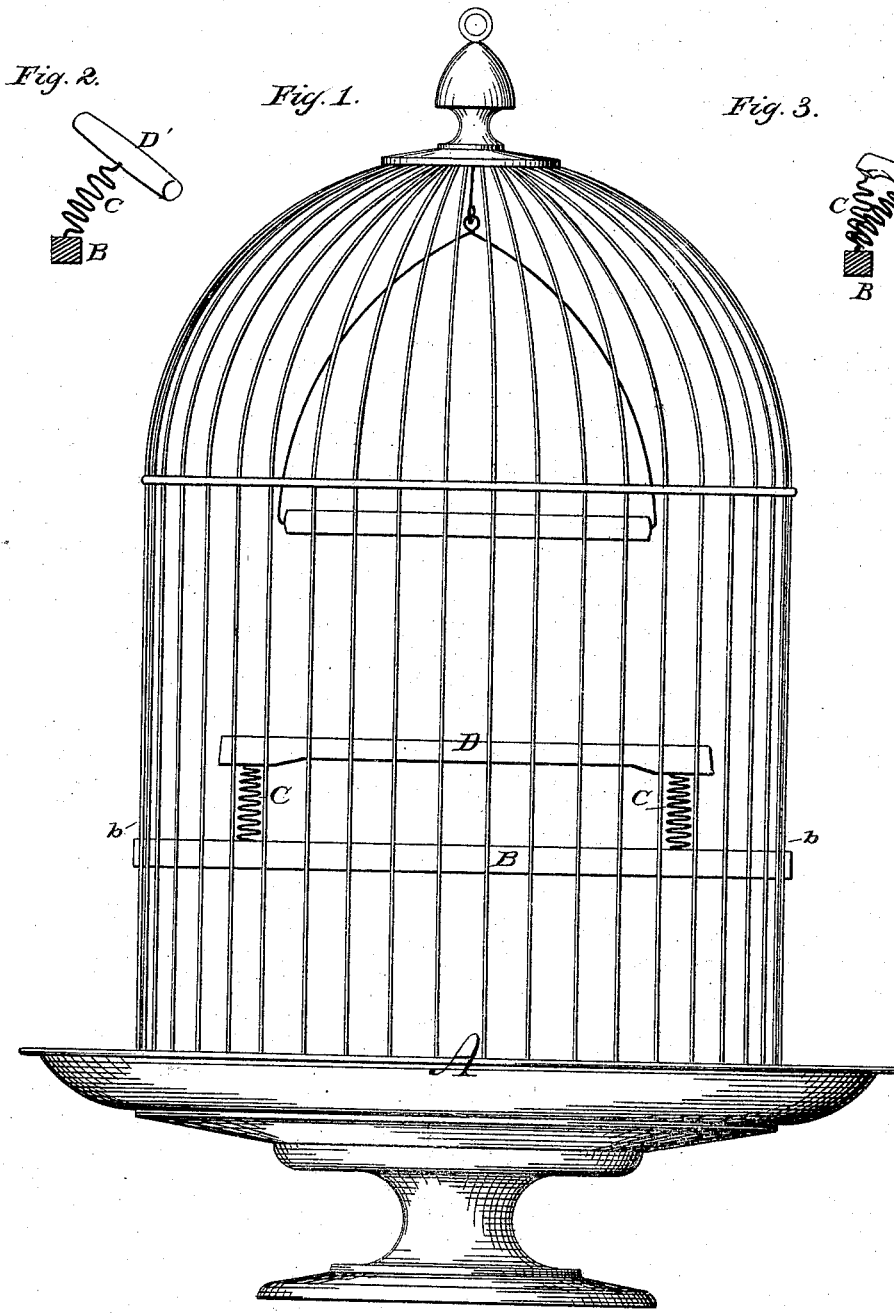
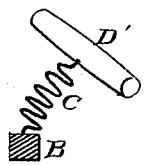
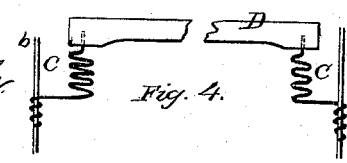
Witnesses:
C. Clarence Poole
Wm. F. Shirey
Inventor:
E. C. Ford
By his Atty
R. D. O. Smith

UNITED STATES PATENT OFFICE.

EDWARD C. FORD, OF WASHINGTON, DISTRICT OF COLUMBIA, ASSIGNOR TO GEORGE ADAMS MORGAN, OF BALTIMORE MARYLAND.

IMPROVEMENT IN SPRING-PERCHES FOR BIRD-CAGES.

Specification forming part of Letters Patent No. 173,934, dated February 22, 1876; application filed January 22, 1876.

*To all whom it may concern:*

Be it known that I, EDWARD C. FORD, of Washington, in the District of Columbia, have invented an Improvement in Spring or Elastic Perches for Bird-Cages, of which the following is a full and exact description:

The natural habitation of our singing-birds is among the pliant boughs and twigs of the forest, and when confined within a cage they are unfavorably affected by the unyielding rigidity of the cage and perches. That this effect is positively depressing is shown by the changed demeanor of the bird whenever the cage is hung upon the branch of a tree, which, being elastic and yielding, permits every movement of the bird to produce an elastic reaction of the perch. Though he knows nothing of this from experience, instinct teaches him that this elastic reaction resembles the swaying of the twig when he alights upon it, and it calls into exercise his art in resting and balancing upon an unsteady and elastic footing. This exercise and art is doubtless the source of enjoyment. At all events, he manifests great pleasure whenever his cage is hung upon some elastic object, as any one may witness who will hang his bird-cage to the branch of a tree on a summer's day.

It is not practicable, however, to secure this source of enjoyment daily to the bird, and, therefore, as a substitute, it has been heretofore proposed to suspend the cage by an elastic spring, and to mount the perches upon springs. The former of these plans is objectionable, because the motion of the cage is apt to throw the water out of the bath-dish, and it also renders the cage insecure when hung in the open air in a current of wind.

My invention, therefore, relates to an improvement in elastic perches to be placed inside a cage, which may have a rigid point of suspension, and thereby afford the bird the same effect of elastic reaction experienced when the cage is suspended from an elastic support. In elastic perches as heretofore constructed the perch has been supported by a spring at one end, and therefore subject to an unequal reaction, according as the bird's weight is applied, more or less, near to the point of support. By supporting the perch upon a spring under each of its ends, or upon a spring placed vertically under its center, this effect may be almost entirely neutralized.

My invention, therefore, consists in supporting a perch upon springs seated below said perch, so that the perch may not only yield in a vertical direction, but in a lateral direction also, as more fully appear in the subjoined description, having reference also to the annexed drawings, wherein—

Figure 1 is an elevation of a bird-cage having my improved perches in place. Figs. 2 and 3 represent the action of the same. Fig. 4 shows a modified mode of attachment.

A is an ordinary bird-cage, having within it my elastic perches. B is an ordinary rigid perch, having its ends split and adjusted to grasp the wires *b b* of the cage. Two elastic helical springs, C C, are seated upon said perch near its ends by inserting the lower end of said spring through a small hole in said perch. Upon the upper ends of said helical spring I secure the perch D, upon which the bird will always alight. Said springs C are very elastic and light, and will not only yield to the weight of the bird vertically, but they will also yield laterally, as shown in Fig. 3, and at whatever part of the perch the bird's weight may rest the perch will yield, and permit him to experience the elastic swaying motion in which he delights; or the perch, as at D', may be supported by a single spring under its center, as shown in Fig. 2, and in this latter arrangement the perch may also swivel upon the upper end of the spring, so as to turn about as the bird alights upon it. In Fig. 4 the perch-springs C are shown attached to the wires *b b* instead of to a rigid perch.

Having described my invention, what I claim as new in bird-cages is—

1. A perch-supporter upon helical springs C, adjusted so that their axes are vertical, and said springs are therefore capable of yielding in all directions with equal facility.

2. A perch, D', mounted by its center, and swiveling upon a spring, C, having a vertical axis, substantially as shown and described.

EDWARD C. FORD.

Witnesses:
A. S. BADGLEY,
J. I. JONES.